May 3, 1960 A. M. KIVARI ET AL 2,935,201
REMOVAL OF GRIT FROM SEWAGE
Filed Feb. 14, 1958 3 Sheets-Sheet 1

INVENTORS.
ARTHUR M. KIVARI
SAMUEL I. BOUSMAN
BY
Christie, Parker & Hale
ATTORNEYS.

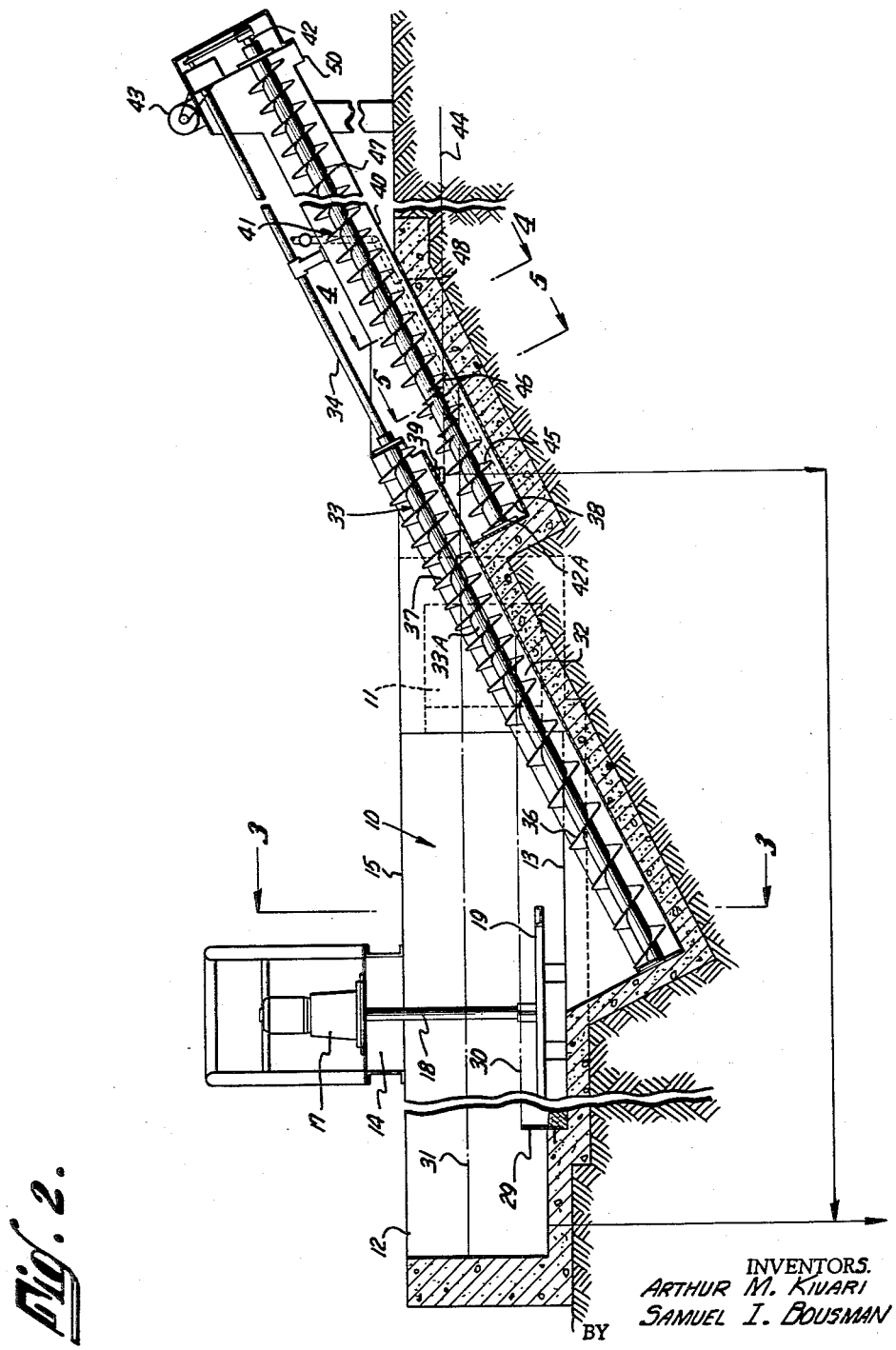

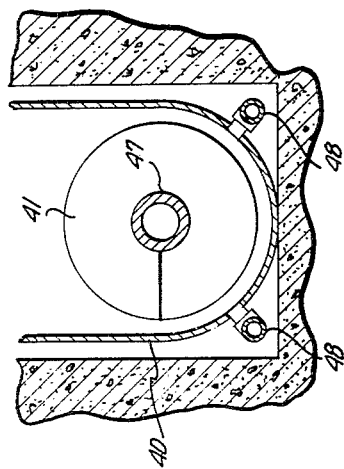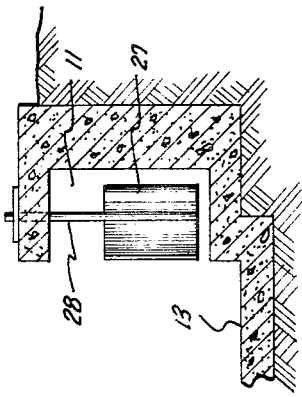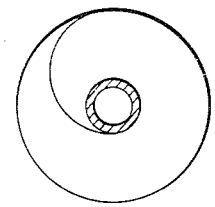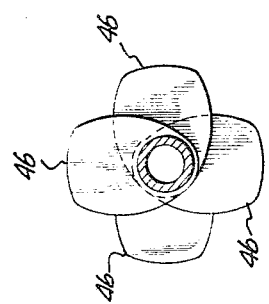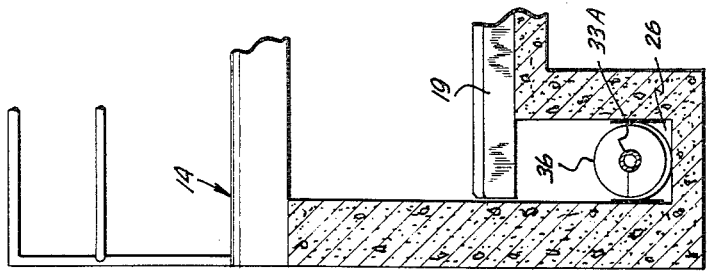

2,935,201
REMOVAL OF GRIT FROM SEWAGE

Arthur M. Kivari, San Mateo, and Samuel I. Bousman, Santa Cruz, Calif., assignors to Process Engineers, Inc., San Mateo, Calif., a corporation of Nevada Application February 14, 1958, Serial No. 715,395

10 Claims. (Cl. 210—519)

This invention is concerned with the removal of grit from sewage and similar liquids containing entrained organic matter and provides improved apparatus for this purpose. More particularly, the invention contemplates improvements in degritting apparatus of the general type disclosed in co-pending application Serial No. 664,810, filed June 10, 1957, by Joseph L. Feeney, to the end that grit removal in such apparatus is accomplished more efficiently and that the removed grit is cleaner.

Most sewage contains grit in addition to dissolved and suspended organic matter. The grit is granular, relatively heavy, and largely inorganic. If this grit is permitted to enter a sewage treatment plant, it causes severe abrasions of pumps, valves, raking mechanisms, etc. Moreover, unless the grit is removed, it ultimately enters digesters where, due to its inorganic nature, it reduces volumetric efficiency of the digesters. Sand and other inorganic matter coarser than 65 mesh and having a specific gravity of 2.65 or more causes the most trouble. Most modern sewage plants aim to remove grit of this coarseness or even finer prior to treatment of the organic content of the sewage. In an effort to bring this about the raw sewage from the mains is run through preliminary settling or "degritting" apparatus before it is run into the treatment plant proper.

The degritting apparatus usually comprises a settlement chamber of such size that the velocity of the sewage stream at average flow is reduced in the chamber to the point where the grit settles. If the settlement chamber is designed for proper velocities at maximum flow, organic matter tends to settle with the grit at flows that are lower than the maximum. This causes difficulties.

The settlement chamber is provided with raking means which moves the settled grit across its bottom to a discharge port or conduit, through which it drops into a classifier or washer. This may be an inclined trough provided with a rake or screw conveyor that moves the grit upward in the trough to discharge and at the same time agitates it to free it from organic solids. Sometimes water sprays are placed in the classifier portion of the apparatus to assist in the separation of organic matter from the inorganic grit.

As long as the flow of sewage through a conventional settlement basin is average, apparatus of the type just described works pretty well. Unfortunately, this average flow only occurs for a short time, certainly not more than a few hours out of each day. Municipal sewage flows frequently range from a noontime peak to an early morning minimum which is a third or less of the peak. When the flow rate exceeds the average, not all of the grit is settled. When the sewage flow is diminished below the average the settlement capacity of the chamber is more than ample for the grit alone, and a large proportion of organic solids settles along with the grit and is raked to the classifier. Then, despite washing, a considerable proportion of the organic matter accompanies the grit to discharge. The organic matter in the grit decays and causes severe odor nuisance in the classifier.

The aforementioned co-pending application provides means for reducing the amount of organic solids entrained in the removed grit by automatically increasing the raking speed as the flow rate of sewage decreases and vice versa, the raking speed being correlated inversely to the flow rate of the sewage.

As a result of our investigations we have developed improvements in grit separation apparatus which markedly reduces the proportion of organic solids that are removed along with the grit even when the Feeney invention is not employed. But our improved apparatus may be equipped with the Feeney controls to produce even better results—with further elimination of odor nuisance, reduction of wash water consumption and the production of a still cleaner grit.

Our improvements are incorporated in grit removal apparatus for removing grit carried in a stream of liquid (say sewage) that also includes solid organic matter and which includes a shallow settlement chamber adapted to contain a pool of the liquid and in which the grit tends to settle along with some of the organic matter. In such apparatus a conduit is connected to one side of the chamber for admitting the liquid stream carrying the grit and organic matter and a second conduit is connected to a second portion of the chamber (say the opposite side) for removing the degritted liquid. In such apparatus, our invention, in one aspect, contemplates an inlet launder extending along and opening into one side of the chamber with the liquid containing the grit and the organic matter entering the conduit from one end. A sump is provided in the bottom of the chamber near one end of the chamber and in the path of coarse grit swept in by the entering stream. Influent deflectors are placed along the juncture between the inflow launder and the settlement chamber or basin, but these deflectors do not extend to the bottom of the launder, so that they do not interfere with the flow of coarse grit to the sump, but tend to distribute fine grit over the entire settlement chamber. When this is done fewer organic solids enter the sump along with the grit, so that the cleaning of the grit becomes a much simpler problem.

The settlement basin in our improved apparatus is provided with raking means for the settled grit disposed in the chamber immediately above its bottom with means for moving these raking means along the bottom toward the sump. In the region of the sump, the raking means preferably move concurrently with the flow of coarse grit from the inlet launder. This correlation of direction of raking means with coarse grit movement in the neighborhood of the sump further aids in reducing the amount of organic matter which is carried with the grit into the sump.

Preferably the raking means pass directly over the sump, and the apparatus is provided with an inclined trough terminating in the sump at its lower end and extending upwardly of the tank and toward the upper surface of the pool therein. A screw conveyor is disposed longitudinally in the trough so that the raking means passes directly over its lower end. This screw conveyor carries the grit upwardly in the trough and simultaneously agitates the grit to dislodge entrained organic material.

In a preferred form of our new apparatus we provide a second sump disposed below the upper end of the first trough for receiving the grit carried upwardly by the first conveyor. This apparatus is also provided with a second inclined trough which terminates in the second sump at its lower end and extends upwardly therefrom. A second screw conveyor is disposed longitudinally in the second trough for conveying the grit longitudinally upward therein from the second sump and for agitating the grit in this second sump.

It is convenient to provide driving means that is common to both conveyors. This may be done simply if the troughs are substantially parallel with each other and both conveyors are likewise substantially parallel.

For best results the second screw conveyor should have at least one interrupted flight a short distance above its lower end and near or in the second sump. Such an interrupted flight allows a load of grit to build up in the second sump and facilitates agitation, scrubbing and washing. The interrupted flights should be shaped smoothly to prevent rags and similar fibrous materials from accumulating on them.

As disclosed in greater detail hereinafter, the lower end of the flights on both screw conveyors should be formed in a smooth spiral substantially tangent to the conveyor shaft in order to prevent rag accumulation in the sumps.

It is desirable to introduce a stream of wash liquid, say water, into the the second sump or second trough or both to dislodge and wash out organic matter that is carried with the sand. We prefer to introduce this wash water as a spray at a plurality of points along the trough.

The wash water employed in the second trough flows into the second sump and under some circumstances can be permitted to flow from here down the first trough and then to the main settlement chamber for grit. However, it is much better to provide the second sump with an overflow for wash water. This wash water then bypasses the first trough and the main grit settlement chamber and is introduced into the effluent of the main settlement chamber. In this way organic matter that is washed out in the second trough has no opportunity to again contaminate grit coming from the main settlement chamber.

The flights on the first or lower screw conveyor preferably are continuous, but the lower flights on this screw conveyor should have a greater pitch than the upper flights. The flights with the greater pitch promote agitation and washing of the sand or grit in the first sump.

The raking means in the settlement basin is preferably a submerged rotating arm driven slowly around a central upright axis. Preferably this rake is driven by a prime mover mounted on a bridge that extends across the main settlement chamber roughly parallel to the influent launder.

These and other aspects of our invention will be understood more thoroughly in the light of the following detailed description of a presently preferred form of our degritter. The detailed description is illustrated by the accompanying drawings, in which:

Fig. 2 is a vertical section taken through the apparatus of Fig. 1 along the line 2—2;

Fig. 3 is a fragmentary sectional elevation of apparatus of Figs. 1 and 2 taken along line 3—3 of Fig. 2 through the first or lower sump of the apparatus;

Fig. 4 is a cross section taken through the second trough and conveyor of the apparatus along the line 4—4 of Fig. 2;

Fig. 5 is a section taken through the interrupted flights of the second screw conveyor taken along the line 5—5 of Fig. 2;

Fig. 6 is an end view of the lowermost flight on both screw conveyors showing the flight shape that is adapted to prevent rag accumulation and the like; and Fig. 7 is a sectional view taken along the line 7—7 of Fig. 1, showing the deflectors disposed to give an uninterrupted path for the coarse grit.

Figure 1:
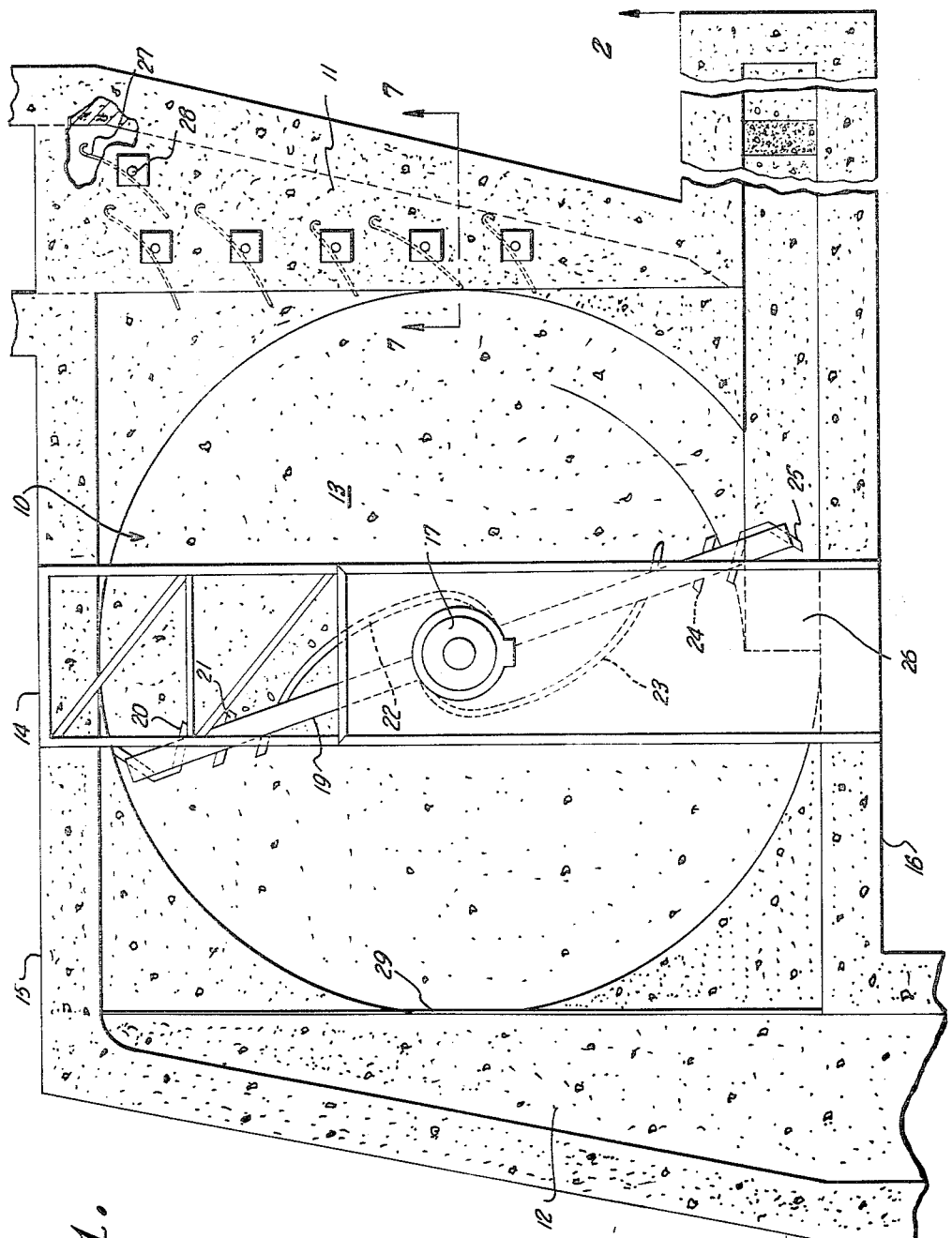
Fig. 1 is a plan view of our preferred degritter with the screw conveyors removed.

The apparatus illustrated by Figs. 1 through 7 comprises a substantially square shallow settlement basin 10. Sewage or the like to be degritted enters the settlement basin as influent through a tapered longitudinal launder 11 (of decreasing cross section in the direction of flow) that communicates with one side of the basin and leaves as degritted effluent through a tapered effluent launder 12 (of increasing cross section in the direction of flow) on the other side of the basin. The basin has a round flat bottom 13 and the corners of the basin are sloped toward this round flat bottom as shown in Fig. 1. A horizontal bridge 14 extends across the center of the basin from end wall 15 to end wall 16 and rests on these walls. The longitudinal axis of this truss is parallel to the longitudinal axes of the influent and effluent launders. The truss supports a conventional drive mechanism 17 provided with a slowly rotating shaft 18 that projects downwardly into the basin below the truss. A rake arm 19 is longitudinally fastened to the bottom of the vertical shaft just above the bottom of the basin and carries a plurality of rakes 20, 21, 22, 23, 24, 25, which tend to move grit settling in the bottom of the settlement chamber in an expanding spiral to a first grit sump 26 disposed adjacent the end wall 16 of the settlement chamber so that the ends of the rake arm pass directly over the sump. As shown in Fig. 1, the rake arm rotates in a clockwise direction.

The influent launder is provided with a plurality of adjustable deflector plates 27 (which may be shifted around vertical shafts 28) in the launder. These deflector plates are set (as shown in Fig. 1) so that the entering stream of sewage is deflected into the settlement basin. The deflector plates clear the bottom of the influent launder slightly (as shown in Fig. 7) so that heavy coarse grit carried in by the influent stream can flow directly to the sump. The movement of this coarse grit directly to the sump is aided by the direction of movement of the rake arm, which is concurrent with the direction of coarse grit movement in the neighborhood of the sump, i.e. in the lower righthand portion of the settlement basin as shown in Fig. 1.

Between the effluent launder and the settlement basin proper there is a low horizontal overflow weir 29 in the form of a thin plate, which is shown plainly in Fig. 2. The lowest liquid level 30 in the settlement basin is established by the top of this weir, but may rise to a level 31 when conditions of maximum flow are encountered.

The first sump forms the bottom end of a first inclined trough 32 which rises gently from the first sump. A first screw conveyor 33 mounted at its upper end on a shaft 34 extending longitudinally the length of the first trough with the lower end of a longitudinal conveyor tube 33A disposed on a journal 35 in the bottom of the first sump. In other words, the bottom of the first screw conveyor is directly under the rake path. The lower end of this first screw conveyor has continuous sharp flights 36 of large pitch. Approximately the upper half of the first screw conveyor has continuous flights 37 of lower pitch.

The lower trough extends over and above a second sump 38 having an overflow 39 for wash water. The second sump forms the bottom support of a second trough 40 which extends upwardly parallel to the first trough and contains a second screw conveyor 41 mounted on a shaft 42 at its upper end and journalled by a mount 42A at its lower end. The shafts of the respective screw conveyors are parallel to each other and are rotated by a driving means 43 that is common to both screws.

Liquid is contained in the second sump up to a level 44 defined by the overflow for the wash. The lowest flights 45 of the second conveyor are continuous. Just above them are a few interrupted flights 46 approximately at the water level of the second sump and above this point the flights 47 of the second conveyor are continuous.

The lowest flight on each of the conveyors is cut off smoothly and substantially tangential to the drive shafts of the conveyors as shown in Fig. 6. This tends to prevent accumulation of rags and the like on the lower ends of the conveyors.

Fig. 5 shows the shape of the interrupted flights 46 of the second conveyor. These flights are interrupted to permit a buildup of grit in the second sump and thus facilitates scrubbing and washing. This washing is brought about by water from longitudinal wash pipes 48 disposed along the lower portion of the second trough. These provide a series of water sprays in the second trough both above and below the level of liquid in the second sump.

In the operation of the apparatus just described, the influent, say a stream of sewage carrying coarse and fine grit together with entrained organic solids, enters through the influent launder into the settlement basin. The coarsest grit tends to flow directly to the first sump in the bottom of the settlement basin, the movement of this and other grit into the sump being aided by the rotating rakes. The screw conveyor in the first sump agitates all the grit that drops into it and tends to free it of suspended organic matter. The freed organic matter tends to flow out over the weir in the settlement basin. The partially cleaned grit, accompanied by some entrained organic solids, is carried upward in the first trough by the first screw conveyor and dumped into the second sump. There the grit is agitated further and at the same time is washed by the entering wash water. Entrained organic matter that is washed out in the second sump flows through the overflow 39 from the second sump and joins the effluent from the main settlement chamber, as indicated by the flow line 49 on Fig. 2. A considerable body of grit tends to be retained for a time in the second sump. This is due to the interrupted flights on the second screw conveyor. These interrupted flights, however, do move washed grit gradually upward in the second trough. Above the water level in the second sump this grit is subjected to further washing and then is conveyed upwardly and over and out a discharge 50 at the upper end of the second trough.

As we indicated at the outset, the apparatus illustrated by Figs. 1 through 7 is adapted to remove grit accompanied by very little organic solids from a sewage stream efficiently and despite great variations of flow rate of the sewage stream.

The efficiency of the apparatus of Figs. 1 through 7 may be still further increased by employing the control mechanism described and claimed in the aforementioned co-pending application of Feeney.

We claim:

1. In apparatus for removing grit carried in a stream of liquid that also contains solid organic matter including a shallow settlement chamber adapted to contain a pool of the liquid and in which the grit settles along with some of the organic matter, a conduit connected to one side of the chamber for admitting the liquid stream carrying the grit and organic matter, and a conduit connected to another portion of the chamber for removing the degritted liquid, the combination which comprises a first sump in the bottom of the chamber, raking means for the settled grit disposed in the chamber immediately above its bottom, means for moving the raking means along said bottom and directly over the sump, a first inclined trough terminating in the sump at its lower end and extending upwardly to a point outside the tank and above the upper surface of the pool of liquid therein, a first screw conveyor disposed longitudinally in the trough with its lower end in the first sump directly under the path of the raking means for conveying the grit upwardly in the first trough and for simultaneously agitating the grit to dislodge entrained organic matter therefrom, a second sump disposed below the upper end of the first trough to receive the grit carried upward by the first conveyor, a second inclined trough terminating in the second sump at its lower end and extending upwardly therefrom, and a second screw conveyor disposed longitudinally in the second trough for conveying the grit upward therein and for agitating the grit in the second sump, and means for driving both screw conveyors.

2. Apparatus according to claim 1 provided with a driving means common to both conveyors.

3. Apparatus according to claim 1 in which both troughs are substantially parallel with each other and both conveyors are substantially parallel with each other and provided with a driving means common to both conveyors.

4. Apparatus according to claim 1 in which the second screw conveyor is provided with an interrupted flight above its lower end but near the second sump.

5. Apparatus according to claim 1 provided with means for introducing a stream of washing liquid into the second sump.

6. Apparatus according to claim 1 provided with means for introducing a stream of washing liquid into the second trough and also provided with a drain for said washing liquid from the second sump.

7. In apparatus for removing grit carried in a stream of liquid that also contains solid organic matter including a shallow settlement chamber adapted to contain a pool of the liquid and in which the grit settles along with some of the organic matter, a conduit connected to one side of the chamber for admitting the liquid stream carrying the grit and organic matter, and an effluent conduit connected to another portion of the chamber for removing the degritted liquid, the combination which comprises a sump below the bottom of the chamber and communicating therewith, raking means for the settled grit disposed in the chamber immediately above its bottom, means for moving the raking means along said bottom to the sump, a first inclined trough terminating in the sump at its lower end and extending upwardly to a point outside the tank and above the upper surface of the pool of liquid therein, a first screw conveyor disposed longitudinally in the trough for conveying the grit upwardly therein and simultaneously agitating the grit to dislodge entrained organic matter therefrom, a second sump disposed below the upper end of the first trough for receiving the grit carried upward by the first conveyor, a second inclined trough terminating in the second sump at its lower end and extending upwardly from said lower end, and a second screw conveyor disposed longitudinally in the second trough for conveying the grit upward therein from the second sump and for agitating the grit in the second sump.

8. Apparatus according to claim 7 provided with means for introducing a washing liquid into the second sump, and an overflow conduit on the second sump connected to the effluent conduit for carrying said washing liquid contaminated with organic solids around the settlement chamber.

9. In apparatus for removing grit carried in a stream of liquid that also contains solid organic matter including a shallow settlement chamber adapted to contain a pool of the liquid and in which the grit settles along with some of the organic matter, a launder connected along one side of the chamber for admitting the liquid stream carrying the grit and organic matter, and a conduit connected to another portion of the chamber for removing the degritted liquid, the combination which comprises a sump in the bottom of the chamber adjacent an end thereof in the path of coarse grit entering through the launder, a plurality of adjustable deflectors disposed in the launder at its junction with the chamber, the deflectors being disposed substantially above the bottom of the launder so as not to interfere with the flow of the coarse grit to the sump, raking means for the settled grit disposed in the chamber immediately above its bottom, means for moving the ranking means along said bottom to the sump, an inclined trough terminating in the sump at its lower end and extending upwardly to a point outside the tank and above the upper surface of the pool of liquid therein, and a screw conveyor disposed longitudinally in the trough for conveying the grit upwardly therein and simultaneously agitating the grit to dislodge entrained organic matter therefrom.

10. In apparatus for removing grit carried in a stream of liquid that also contains solid organic matter and including a shallow settlement chamber adapted to contain a pool of the liquid and in which the grit settles along with some of the organic matter, a conduit connected to one side of the chamber for admitting the liquid stream carrying the grit and organic matter, and a conduit connected to another portion of the chamber for removing the degritted liquid, the combination which comprises a sump in the bottom of the chamber, the sump having a substantially vertical wall with its upper edge lying in at least a portion of the chamber bottom, raking means for the settled grit disposed in the chamber immediately above its bottom, means for moving the raking means along said bottom and directly over said upper edge of the wall of the sump, an inclined trough terminating in the sump at its lower end and extending upwardly to a point outside the chamber and above the upper surface of the pool of liquid therein, and a conveyor disposed longitudinally in the trough with its bottom end in the sump under the said upper edge of the sump wall and directly under the path of the raking means for conveying the grit upwardly in the trough and simultaneously agitating the grit to dislodge entrained organic matter therefrom.

References Cited in the file of this patent

UNITED STATES PATENTS

| | | |
|---|---|---|
| 1,044,844 | Argall | Nov. 19, 1912 |
| 1,423,698 | Thruston | July 25, 1922 |
| 2,033,213 | Weber | Mar. 10, 1936 |
| 2,098,024 | Bailey | Nov. 2, 1937 |
| 2,202,475 | Wileman | May 28, 1940 |
| 2,491,912 | Walker | Dec. 20, 1949 |